(12) United States Patent
Magee et al.

(10) Patent No.: US 7,187,734 B2
(45) Date of Patent: Mar. 6, 2007

(54) METHOD OF SLIP COMPENSATION FOR INTEGER FREQUENCY OFFSET CORRECTION IN A WIRELESS COMMUNICATION SYSTEM

(75) Inventors: David P. Magee, Plano, TX (US); Srinath Hosur, Plano, TX (US); Manish Goel, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 718 days.

(21) Appl. No.: 10/438,243

(22) Filed: May 14, 2003

(65) Prior Publication Data

US 2003/0227978 A1    Dec. 11, 2003

Related U.S. Application Data

(60) Provisional application No. 60/380,609, filed on May 14, 2002, provisional application No. 60/378,114, filed on May 14, 2002.

(51) Int. Cl.
*H03D 1/04* (2006.01)
*H04J 1/00* (2006.01)

(52) U.S. Cl. .................. 375/346; 375/350; 370/482

(58) Field of Classification Search ............ 375/346, 375/350, 265, 347; 370/208, 210, 252, 482
See application file for complete search history.

(56) References Cited

U.S. PATENT DOCUMENTS

| | | | | |
|---|---|---|---|---|
| 5,812,523 | A | * | 9/1998 | Isaksson et al. ............ 370/208 |
| 6,226,337 | B1 | * | 5/2001 | Klank et al. ................ 375/367 |
| 6,996,156 | B1 | * | 2/2006 | Ono .......................... 375/147 |

\* cited by examiner

*Primary Examiner*—Khai Tran
(74) *Attorney, Agent, or Firm*—Steven A. Shaw; W. James Brady; Frederick J. Telecky, Jr.

(57) ABSTRACT

A method of correctly estimating the frequency offset when the CPE modem has already acquired and is tracking the OFDM burst boundaries in an OFDM-based, wireless communication system. CPS data in an OFDM-based, wireless communication system is modulated as QPSK data in the training tones of the data burst. As long as some bursts have the CPS data modulation and some bursts do not have the CPS data modulation, the CPS data can be recovered. A slip results when there is a linear phase difference across the tones (after the FFT) between the current and the previous burst. This linear phase difference is generally taken care of by the channel estimation obtained using the pilot tones. This phase difference is however, now compensated for correct frequency offset estimation which occurs before the channel estimation and CPS decoding steps.

17 Claims, 1 Drawing Sheet

METHOD OF SLIP COMPENSATION FOR INTEGER FREQUENCY OFFSET CORRECTION IN A WIRELESS COMMUNICATION SYSTEM

CROSS REFERENCES TO RELATED APPLICATIONS

This application claims the benefit, under 35 U.S.C. §119(e)(1) of U.S. Provisional Application Nos. 60/380,609 (TI-33798P) and 60/378,114(TI-33796P), both filed May 14, 2002, and both incorporated herein by this reference. This application is related to co-pending and commonly assigned patent application Ser. No. 10/438,242(TI-33796).

BACKGROUND OF THE INVENTION

1. Field of the Invention

This invention relates generally to wireless communication systems, and more particularly, to a method of implementing slip compensation for integer frequency offset correction in an OFDM-based wireless communication system.

2. Description of the Prior Art

Coding parameters associated with most wireless communication systems are generally modulated into a transmitted signal that assists with configuration of Customer Premise Equipment (CPE). The CPE modem has to perform integer frequency offset estimation and correction to receive data transmitted by the headend (HE). Orthogonal Frequency Division Modulation (OFDM) is a technique for providing fixed broadband wireless access (BWA) at high data rates to homes and small offices. The HE, using this technique, broadcasts a burst of data using OFDM. As shown in FIG. 1, an OFDM burst is constructed as follows: data symbols, zeros, and pilot/training symbols (total N symbols 110) are assembled in the frequency domain and the inverse FFT (IFFT) of the symbols 125 is output from the IFFT 120 to form a time domain representation of the symbols at 130. A cyclic prefix and postfix are usually added to the resulting time domain samples as shown at block 140. The cyclic prefix is simply the last v samples of the IFFT signal and the cyclic postfix is simply the first L samples of the IFFT signal. The cyclic prefix is appended to the beginning of the N time domain samples and the cyclic postfix is appended to the end of the N time domain samples, resulting in an OFDM burst size of N+v+L samples at 145. FIG. 1 illustrates the construction of an OFDM burst. The OFDM burst can then be upsampled, filtered, upconverted, and transmitted.

The OFDM receiver can have one or two antenna. The following discussion assumes a single receive antenna. Extension to a dual antenna system involves combining the antenna outputs appropriately and the following discussion can be easily be extended to a dual antenna system.

In order to receive the signal from the HE, the CPE modem first has to synchronize to the HE. This implies that the modem has to perform the following initial steps a) check to determine if it is receiving enough signal strength, b) acquire and track the OFDM burst boundaries for proper FFT operation, c) estimate and correct the frequency offset between its local oscillator and that of the HE, d) decode the coding parameter signaling (CPS) parameters transmitted on the training tones, and e) perform channel estimation, data demodulation, decoding (forward error correction, FEC) and medium access controller (MAC) synchronization.

The CPE modem correlates L samples of the received signal after demodulation and analog to digital conversion with L corresponding samples spaced apart by N samples in order to acquire and track the OFDM burst boundaries. The average energy of the 2L samples is then subtracted from the correlation to yield the burst timing metric. In the case of two antennas, the burst timing metric is computed for each of the antennas individually and then combined using any of the standard combining techniques such as equal gain, maximal ratio, etc. Due to the use of a cyclic post-fix, the resulting burst timing cost function (BTCF) has a minimum at the valid start of an OFDM burst boundary. A burst boundary/time tracking algorithm tracks the minimum of the BTCF and configures the hardware and the FFT 230 to start at a valid minimum. Thus, during tracking, the N samples 210 and 220 for the FFT 230 out of the N+v+L sample size burst can be grabbed a few samples earlier or later as compared to the previous burst. This results in what is called a slip such as seen in FIG. 2 at 215.

A slip results in a linear phase difference across the tones (after the FFT 230) between the current and the previous burst. This linear phase is normally taken care of by the channel estimation obtained using the pilot tones. This phase difference should however, be compensated for correct frequency offset estimation which occurs before the channel estimation and CPS decoding steps.

In OFDM-based communication systems, the training tones (i.e. pilot tones) are modulated with CPS data that denote the transmission parameters such as constellation size for data modulation, coding rate for the Reed-Solomon decoder and depth for the interleaver. One technique known to those skilled in the art of wireless communication systems and that has been proposed as a Broadband Wireless Interface Forum (BWIF) standard for broadband wireless interface technology is problematic since it did not consider any timing correction, or slip correction, that might be required when evaluating two consecutive data bursts. Such a timing correction is necessary if and when one data burst slips relative to a previous data burst as a result of variations in a wireless communication channel and/or drift in the CPE clock relative to the HE clock. The present inventors have discovered that known CPS decoding techniques most often fail to recover the foregoing CPS data in the absence of slip correction.

In most wireless communication systems, frequency correction is determined by evaluating a particular cost function. This cost function usually involves the product of several bursts and determining the index where the cost function is a minimum. This minimum location can then be related to the integer frequency offset. This optimization procedure however, often occurs without considering the timing correction required when the bursts slip relative to each other. In view of the foregoing, there is a need in the wireless communication art for a method for achieving slip compensation for integer frequency offset correction in an OFDM-based, wireless communication system.

SUMMARY OF THE INVENTION

The present invention is directed to a method of correctly estimating the frequency offset when the CPE modem has already acquired and is tracking the OFDM burst boundaries in an OFDM-based, wireless communication system. CPS data in an OFDM-based, wireless communication system is modulated as QPSK data in the training tones of the data burst. As long as some bursts have the CPS data modulation and some bursts do not have the CPS data modulation, the CPS data can be recovered. A slip results when there is a linear phase difference across the tones (after the FFT) between the current and the previous burst. This linear phase difference is generally taken care of by the channel estimation obtained using the pilot tones. This phase difference however, should be compensated for correct frequency offset estimation which occurs before the channel estimation and CPS decoding steps.

Correct determination of the integer frequency offset requires that the pilot tones add in phase. In the case of slip, s, between two consecutive bursts, it can be shown that $$\hat{P}[k, b] = e^{-j\frac{2\pi}{N}ks} Y[k, b] Y^*[k, b-1] = e^{-j\frac{2\pi}{N}ks} P[k, b]$$

where Y[k,b] denotes the frequency response of tone k in data burst b, Y*[k, b−1] denotes the complex conjugate of the frequency response of tone k in data burst b, N is the number of tones in data burst b, and the slip value s equals −1 for a negative slip, 0 for no slip and +1 for a positive slip.

Thus, the slip corrupts the phase, and hence the integer frequency estimates and also interferes with finding the correct starting point of the AAB/OCC* sequence required for both the CPS demodulation and the integer frequency estimation. For BWIF systems, AAB denotes where the CPS encoding occurs in the burst sequence. 'A' is a normal burst. 'B' is a CPS encoded burst. Thus, the burst sequence can be written as AABAABAABAAB . . . , or, in abbreviated form, it is written as AAB. The sequence OCC* is the resulting phase angle sequence detected on the pilot tones, burst to burst (i.e., by reviewing the angle of the complex conjugate multiply). Thus, referring back to AAB, the phase angle between 'A' and 'A' should be zero (0), the phase angle between 'A' and 'B' should be the phase sequence 'C' (the encoded version of the CPS data), and the phase angle between 'B' and 'A' should be the conjugate of the phase angle 'C' (C conjugate or C*).

According to one aspect of the invention, a method of compensating for the effect of slip associated with integer frequency offset correction in a wireless communication system is implemented by multiplying P[k,b] by $$e^{-j\frac{2\pi}{N}ks},$$

where P is a data structure of phasors indexed by $k_T$. This operation nullifies the effect of slip and results in the correct integer frequency estimate.

According to still another aspect of the invention, a method of compensating for the effect of slip in an OFDM-based wireless communication system is implemented by averaging slip values to minimize the occurrence, and detection, of false slips being propagated through the signal processing algorithms of the OFDM-based wireless communication system. The slip computation that results from averaging slip values can be written as $$s[b] = \begin{cases} +1 & (MinIndex > DesiredIndex + SlipTotal[b-1]) \\ 0 & (MinIndex = DesiredIndex + SlipTotal[b-1]) \\ -1 & (MinIndex < DesiredIndex + SlipTotal[b-1]) \end{cases}$$

where $SlipTotal[b] = \sum_{k=0}^{SlipDelay-1} s[b-k].$

The SlipDelay variable refers to the timing delay between the time when the timing adjustment is made to the data stream and the time when the slip identification algorithm detects the adjustment. By computing the slip value in this manner, unnecessary timing adjustments can be avoided and the signal-to-noise ratio (SNR) of the signal processing algorithms can be maintained in the wireless communication system.

BRIEF DESCRIPTION OF THE DRAWINGS

Other aspects, features and attendant advantages of the present invention will be readily appreciated as the invention becomes better understood by reference to the following detailed description when considered in connection with the accompanying drawings wherein.

Figure 1:
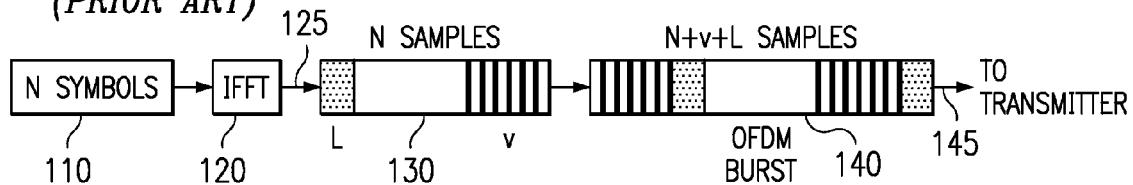
FIG. 1 illustrates the construction of an OFDM burst.
Figure 2:
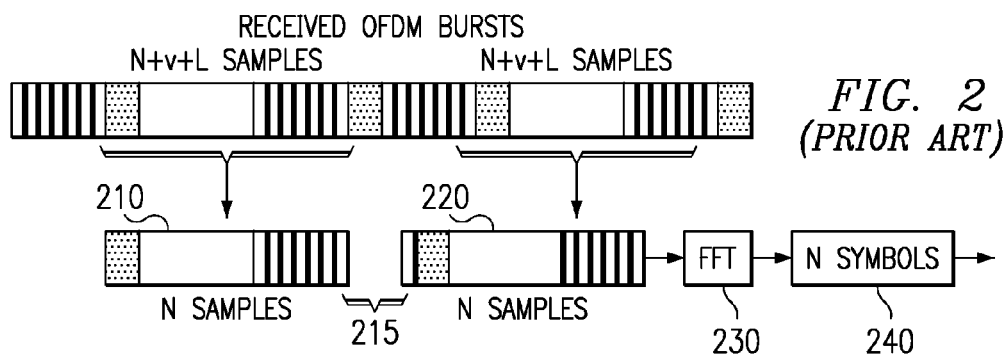
FIG. 2 illustrates a slip in OFDM burst reception.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments discussed herein below are best understood by first reiterating relevant portions of the background set forth herein before to more clearly establish a context for the present invention. As with most wireless communication systems, coding parameters are often modulated into a transmitted signal that assists with configuration of the Customer Premise Equipment (CPE). In OFDM-based systems, the training tones (i.e. pilot tones) are modulated with Coding Parameter Signaling (CPS) data that denote the transmission parameters such as constellation size for data modulation, coding rate for the Reed-Solomon decoder and depth for the interleaver. One technique associated with a proposed BWIF standard for retrieving this CPS data does not employ any timing correction (slip correction) that might be required when evaluating two consecutive data bursts. The present inventors have found that a timing correction is necessary when one data burst slips relative to a previous data burst as a result of variations associated with the wireless communication channel and/or drift in the CPS clock with respect to the HE clock. The present inventors have determined that the foregoing CPS decoding fails most of the time in the absence of such slip correction. In view of the foregoing, a preferred embodiment of the present invention is now set forth below that describes a method for determining slip compensation to achieve integer frequency offset correction associated with OFDM-based, wireless communication systems when the CPE modem has already acquired and is tracking the OFDM burst boundaries.

In most wireless communication systems, frequency correction is determined by evaluating a particular cost function. This cost function usually involves the product of several bursts and determining the index where the cost function is a minimum. This minimum location can then be related to the integer frequency offset. This optimization procedure however, generally occurs without considering the timing correction required when the bursts slip relative to each other because of variations in the wireless communication channel and/or drift in the CPE clock with respect to the HE clock. One method for determining the integer frequency offset was originally proposed as a BWIF standard, but also did not consider the timing correction, or slip correction, that might be required when evaluating the product of several bursts. The present inventors have found integer frequency offset determination to be more difficult without this slip correction.

Slips result from variations in the wireless communication channel and/or drift in the Customer Premise Equipment (CPE) clock. By identifying when slips occur and making the proper timing adjustment to the data stream, slip correction can be achieved in the system. Furthermore, slip correction is necessary for the proper operation of FFT algorithms, channel estimation algorithms and noise estimation algorithms that appear in OFDM-based communication systems.

In view of the foregoing, a most preferred method to achieve timing correction into the integer frequency offset determination process associated with OFDM-based, wireless communication systems is now described in detail herein below. The method addresses the correct estimation of the frequency offset when the CPE modem has already acquired and is tracking the OFDM burst boundaries.

The received signal is downconverted to baseband using an estimate of the center frequency at which the HE is transmitting. There could be an error between this frequency and that of the HE used for upconversion. This results in a frequency offset between the actual baseband spectrum (which should be centered around zero frequency) and the spectrum of the downconverted signal. In the context of the OFDM system, the frequency error can be divided into two components (i.e. the fractional and the integer frequency error). A fractional frequency error causes the tones in the frequency domain (after the FFT) to be shifted by a non integral number of tones, while the integer frequency error causes it to be shifted by an integer number of tones. The total frequency error can be written as $$\Delta f = \Delta f_{frac} + \Delta f_{int} \quad (1)$$

where $$\Delta f_{frac} < \frac{f_s}{N} \text{ and } \Delta f_{int} < \frac{k f_s}{N}$$

for some integer k and $f_s$ is the sampling frequency of the receiver. The L sample correlation value computed during boundary tracking, at the minimum location of the Burst Timing Cost Function (BTCF), can be written as (for the noiseless case)

$$Y = \sum_{k=0}^{L-1} x^*(k-N)x(k) = e^{j2\pi \Delta f_{frac} N} \sum_{k=0}^{L-1} |x(k)|^2 \quad (2)$$

It can be seen from Equation (2) that $\Delta f_{frac}$ can be obtained from the phase angle of the L sample correlation performed during the BTCF estimation.

Once the fractional frequency error is estimated and corrected, the integer frequency error has to be corrected and estimated. The v pilot tones are used for integer frequency error estimation. Due to the integer frequency offset however, the location of the pilot tones is shifted and should be estimated. The location of the pilot tones along with the phase difference on the pilot tones from burst to burst provides the integer frequency.

Figure 3:
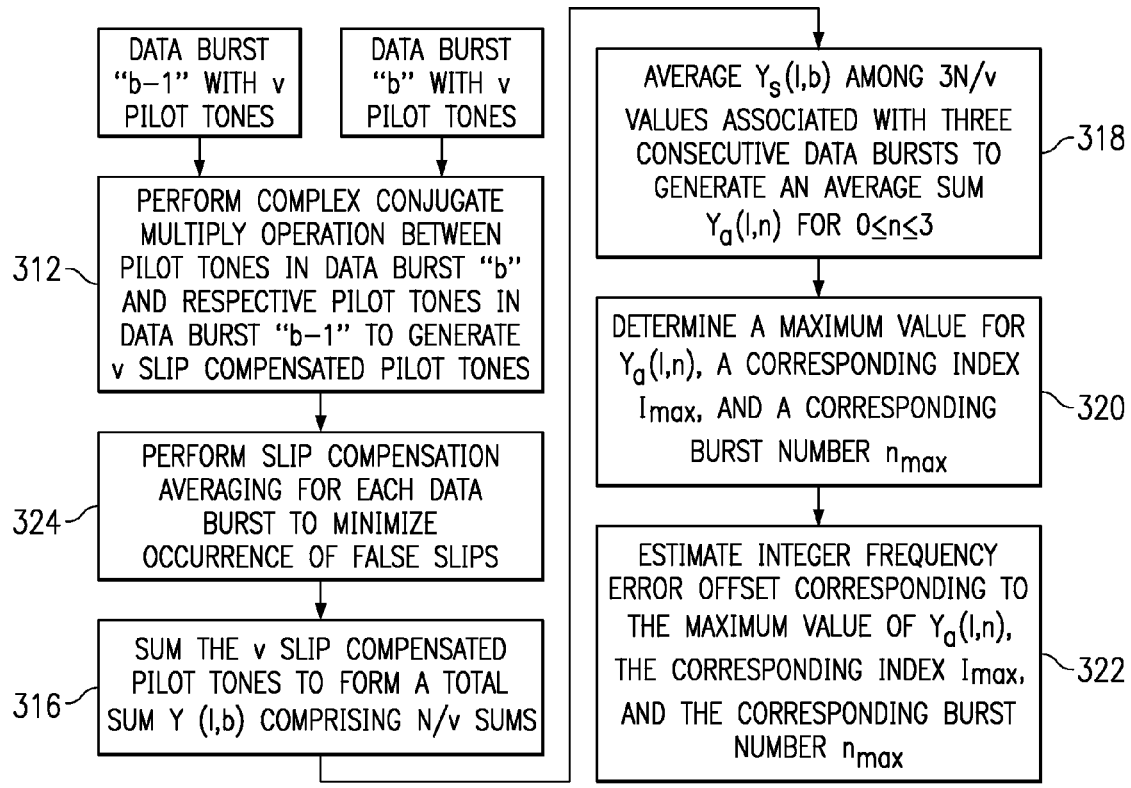
FIG. 3 is a flowchart depicting a method for estimating the frequency offset when the CPE modem has already acquired and is tracking the OFDM burst boundaries in an OFDM-based, wireless communication system according to one embodiment of the present invention.

The phases of the v pilot tones in the OFDM system are modulated with a repetitive v-length phase pattern. The phase pattern repeats every three bursts and encodes the CPS data. Specifically, a v-length phase pattern "A" (note that there are v phases in "A") modulates the pilot tones in the first burst; the same phase pattern, "A", modulates the pilot tones in the second burst; while a different v-length phase pattern, "B", modulates the pilot tones in the third burst. The phase difference between the pattern "A" and the pattern "B" encodes the CPS data. Keeping the foregoing discussion in mind, a most preferred embodiment of the integer frequency algorithm 310 is now described herein below with reference to FIG. 3.

First, the tones Y[k, b] of the current burst b are multiplied with the complex conjugates of the tones of the burst b−1 as shown in block 312. This is done for two purposes. Firstly, it eliminates any of the phase rotations due to the channel, and secondly, it eliminates the common phase, "A", between two consecutive bursts so that the resulting pilot tones have either zero phase or are modulated by a phase related to the CPS parameters. This correlation operation is mathematically represented as $$P[k,b] = Y[k,b]Y^*[k,b-1] \text{ for } 0 \leq k \leq N-1 \quad (3)$$

Then, as shown in block 324, slip compensation averaging is performed for the v slip compensated pilot tones generated in block 312 to minimize the occurrence of false slips. Thus, in order to identify the position of the pilot tones, v tones spaced $$\frac{N}{v}$$

tones apart are summed as shown in block 316. In the case of integer frequency offset, these pilot tones are circularly shifted. A total of $$\frac{N}{v}$$

such sums are formed and the index of the maximum of these sums indicates the position of the pilot tones (as the pilot tones add in phase while the data tones do not). This operation is mathematically represented as $$P_s[l, b] = \sum_{m=0}^{v-1} P\left(l + m\frac{N}{v}, b\right) \text{ for } 0 \le l \le \frac{N}{v} - 1 \quad (4)$$

Next, it has already been established that the pilot tones are modulated by the AAB sequence. The phase difference between consecutive bursts results in the sequence OCC*. The integer frequency estimate requires both the position of the pilot tones and their phase. Thus, the integer frequency estimate is valid only when the phase difference between the consecutive bursts is zero. It is therefore necessary to find the start of the OCC* sequence. This is done by computing and finding the maximum location of $P_s[l,b]$, not only among the $$\frac{N}{v}$$

values at a single burst b, but among the $$3\frac{N}{v}$$

values of three consecutive bursts as shown in block 318. In order to average against background noise, the $P_s[l,b]$ can be averaged as $$P_a[l, n] = \sum_{m=0}^{\lfloor b/3 \rfloor} P_s[l, n + 3m] \text{ for } 0 \le l \le \frac{N}{v} - 1 \text{ and } n = \mathrm{mod}(b, 3) \quad (5)$$

where the mod( ) function performs the modulus operation. Alternatively, the above averaging can be performed using a single pole filter as $$P_a[l, n] \leftarrow (l, \beta)P_a[l, n] + \beta P_s[l, b] \text{ for } 0 \le l \le \frac{N}{v} - 1 \text{ and } n = \mathrm{mod}(b, 3) \quad (6)$$

where β is a programmable constant in the range [0,1).

Next, the integer frequency error is then estimated using the maximum value, its corresponding index $l_{max}$, and the corresponding burst number $n_{max}$ as depicted in blocks 320 and 322. The integer frequency error is then estimated (in number of frequency bins) as $$\Delta f_{int} = \mathrm{round}\left(\frac{N}{2\pi L}\mathrm{angle}(P_a[l_{max}, n_{max}])\right) - \frac{v}{L}l_{max} \quad (7)$$

where the angle( ) function returns a value in the range of [0,2π) to represent the angle of its complex argument and the round( ) function returns an integer value in the range of $$\left[0, \frac{N}{L} - 1\right].$$

In view of the foregoing discussion directed to an integer frequency algorithm, it can be seen that the pilot tones should add in phase for proper determination of the integer frequency offset. In case of slip, s, between two consecutive bursts, it can be shown that the correlation can be written as $$\hat{P}[k, b] = e^{-j\frac{2\pi}{N}ks}Y[k, b]Y^*[k, b-1] = e^{-j\frac{2\pi}{N}ks}P[k, b] \quad (8)$$

when the frequency response data (i.e. FFT data) is in normal order. In the case where the frequency response data has been FFT-shifted, π must added (or subtracted) to the phasor angle. By reviewing Equation (8), one can deduce that slip corrupts the phase and hence the integer frequency estimates and also interferes with finding the correct starting point of the AAB/OCC* sequence required for integer frequency estimation. The slip effects can be nullified simply by multiplying P[k, b] by $$e^{-j\frac{2\pi}{N}ks}$$

to provide the correct integer frequency estimate. In real time slip compensation however, there is usually a time delay between the time when the timing adjustment is made to the data stream and the time when the slip compensation algorithm detects the adjustment. As a result, the slip compensation algorithm will continue to correct for a slip even though the necessary corrective action has already taken place. As a result, false (and unnecessary) slips take place in the data path of the communication system. These false slips cause the slip value to oscillate between the values of −1 and +1 when monitored on a burst by burst bases.

Since, as discussed above, slip correction in the signal processing algorithms involves a complex multiplication by $$e^{-j\frac{2\pi}{N}ks},$$

where k∈{0, . . . N−1}, the multiplication will introduce undesirable and unnecessary noise into the calculations. For example, k=0 corresponds to the dirty "one" because "one" is not represented exactly with Q15 notation. In view of the foregoing, the embodiments of the present invention discussed herein above most preferably also include a technique for averaging the slip values to minimize the occurrence, and detection, of false slips being propagated through the signal processing algorithms of an OFDM-based, wireless communication system. A preferred technique for averaging the slip values is now described in further detail herein below.

While similar algorithms exist for identifying and correcting slips during data demodulation, the instant invention provides a method in which slip correction occurs during the CPS decode operation to ensure that the transmission parameters are properly decoded. Algorithms such as those discussed herein before exist in most wireless communication systems for identifying and correcting slips in the data stream. Slip identification usually occurs by computing the correlation between two consecutive data bursts and identifying where the minimum value occurs as discussed herein above. The index value for the minimum value is compared to some desired index value for the minimum and the difference denotes the necessary timing adjustment required to properly align the data stream. The slip value s for data burst b can therefore be computed as $$s[b] = \begin{cases} +1 & \text{Min}Index > DesiredIndex \\ 0 & \text{Min}Index = DesiredIndex \\ -1 & \text{Min}Index < DesiredIndex \end{cases}$$

where MinIndex is the index value of the minimum correlation value between two consecutive data bursts and DesiredIndex is the desired index value for the correlation value between the two consecutive data bursts.

After the slip correction is made to the data stream, there is a time delay before the slip identification algorithm detects the adjustment. This time delay will tend to cause the slip value to oscillate between the values of −1 and +1. A slip averager, as shown in block 324, is introduced into the computations to correct this problem in accordance with particular preferred embodiments of the present invention discussed below.

$$s[b] = \begin{cases} +1 & (\text{Min}Index > DesiredIndex + SlipTotal[b-1]) \\ 0 & (\text{Min}Index = DesiredIndex + SlipTotal[b-1]) \\ -1 & (\text{Min}Index < DesiredIndex + SlipTotal[b-1]) \end{cases}$$

where $SlipTotal[b] = \sum_{k=0}^{SlipDelay-1} s[b-k].$

The SlipDelay variable refers to the timing delay between the time when the timing adjustment is made to the data stream and the time when the slip identification algorithm-detects the adjustment. By computing the slip value in this manner, unnecessary timing adjustments can be avoided and the SNR of the signal processing algorithms can be maintained in the wireless communication system.

In view of the above, it can be seen the present invention presents a significant advancement in the art of OFDM-based, wireless communication systems. Further, this invention has been described in considerable detail in order to provide those skilled in the wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method for implementing integer offset correction in an OFDM-based transceiver device, the method comprising the steps of:

receiving two consecutive data bursts, b and b−1, each data burst including v pilot tones $$\frac{N}{v}$$

tones apart, wherein N is the total number of tones in a data burst;

performing a complex conjugate multiply operation between the tones in data burst b and the respective tones in data burst b−1 until the complex conjugate multiply operation has been performed for all of the tones to generate a correlation between the two consecutive data bursts;

summing the correlation values to form a total sum $P_s[l,b]$ comprising $$\frac{N}{v}$$

sums;

averaging the total sum $P_s[l,b]$ among $$3\frac{N}{v}$$

values associated with three consecutive data bursts to generate an average summation $P_a[l,n]$ for $0 \leq n \leq 2$;

determining a maximum value for the summation $P_a[l,n]$, a corresponding index $l_{max}$, and a corresponding burst number $n_{max}$; and estimating an integer frequency error offset corresponding to the maximum value for the summation $P_a[l,n]$, the corresponding index $l_{max}$, and the corresponding burst number $n_{max}$.

2. The method according to claim 1 wherein the step of summing the correlation values to form a total sum $P_s[l,b]$ comprising $$\frac{N}{v}$$

sums is performed according to the relationship $$P_s[l,b] = \sum_{m=0}^{v-1} P\left(l + m\frac{N}{v}, b\right)$$

for $$0 \leq l \leq \frac{N}{v} - 1,$$

where N is the number of tones in a data burst and v is the number of pilot tones in a data burst.

3. The method according to claim 1 wherein the step of averaging $P_s[l,b]$ sums among $3\frac{N}{v}$ values associated with three consecutive data bursts to generate an average summation $P_a[l,n]$ for $0 \le n \le 2$ is performed according to the relationship $$P_a[l, n] = \sum_{m=0}^{\lfloor \frac{b}{3} \rfloor} P_s[l, n + 3m] \text{ for } 0 \le l \le \frac{N}{v} - 1 \text{ and } n = \mathrm{mod}(b, 3).$$

4. The method according to claim 1 wherein the step of averaging $P_s[l,b]$ sums among $3\frac{N}{v}$ values associated with three consecutive data bursts to generate an average summation $P_a[l,n]$ for $0 \le n \le 2$ is performed using a single pole filter according to the relationship $$P_a[l, n] \leftarrow (l - \beta) P_a[l, n] + \beta P_s[l, b]$$

for $$0 \le l \le \frac{N}{v} - 1$$

and n=mod(b3), where $\ominus$ is a programmable constant in the range [0,1).

5. The method according to claim 1 wherein the step of estimating an integer frequency error offset corresponding to the maximum value for the summation $P_a[l,n]$, the corresponding index $l_{max}$, and the corresponding burst number $n_{max}$ is performed according to the relationship $$\Delta f_{int} = \mathrm{round}\left(\frac{N}{2\pi L} \mathrm{angle}(P_a[l_{max}, n_{max}])\right) - \frac{v}{L} l_{max},$$

where the angle( ) function returns a value in the range of $[0, 2\pi)$ to represent the angle of its complex argument and the round( ) function returns an integer value in the range of $$\left[0, \frac{N}{L} - 1\right].$$

6. The method according to claim 1 wherein the complex conjugate multiply operation is performed according to the relationship $$\hat{P}[k, b] = e^{-j\frac{2\pi}{N} ks} Y[k, b] Y^*[k, b - 1],$$

and wherein $Y[k,b]$ is the frequency response of tone k in data burst b, N is the number of tones in a data burst, s is the slip value and $$\frac{2\pi}{N} k$$

is a sequence of known phase rotations.

7. The method according to claim 6 wherein the slip value s equals −1 when data burst b experiences a negative slip with respect to data burst b−1, and wherein the slip value s equals +1 when data burst b experiences a positive slip with respect to data burst b−1, and further wherein the slip value s equals 0 when data burst b experiences no slip with respect to data burst b−1.

8. The method according to claim 6 wherein the slip value s for data burst b, which can be written as s[b], is determined according to the $$s[b] = \begin{cases} +1 & (MinIndex > DesiredIndex + SlipTotal[b-1]) \\ 0 & (MinIndex = DesiredIndex + SlipTotal[b-1]) \\ -1 & (MinIndex < DesiredIndex + SlipTotal[b-1]) \end{cases}$$

$$\text{where } SlipTotal[b] = \sum_{k=0}^{SlipDelay-1} s[b-k],$$

and wherein SlipDelay is a timing delay between the time when a timing adjustment is made to a data stream containing the data bursts and the time when a corresponding slip identification algorithm detects the adjustment, and further wherein Minindex is the index value of the minimum correlation value between two consecutive data bursts and DesiredIndex is the desired index value for the correlation value between the two consecutive data bursts.

9. A method for implementing integer offset correction in a transceiver device, the method comprising the steps of:

receiving consecutive data bursts comprising data burst b and data burst b−1 wherein each data burst comprises N tones including V pilot tones spaced $$\frac{N}{v}$$

tones apart;

performing a complex conjugate multiply operation between the N tones in data burst b and the respective N tones in data burst b−1 until the complex conjugate multiply operation has been performed for all of the tones to generate a correlation of the consecutive data bursts;

summing the correlation values to form a total sum $P_s[l,b]$ comprising $$\frac{N}{v}$$

sums;

averaging the total sum $P_s[l,b]$ among $$3\frac{N}{v}$$

values associated with three consecutive data bursts to generate an average summation $P_a[l,n]$ for $0 \leq n \leq 2$;

determining a maximum value for the summation $P_a[l,n]$, a corresponding index $l_{max}$ and a corresponding burst number $n_{max}$; and estimating (in number of frequency bins) an integer frequency error offset corresponding to the maximum value for the summation $P_a[l,n]$, the corresponding index $l_{max}$ and the corresponding burst number $n_{max}$.

10. The method according to claim 9 wherein the step of summing the correlation values to form a total sum $P_s[l,b]$ comprising $$\frac{N}{v}$$

sums is performed according to the relationship $$P_s[l, b] = \sum_{m=0}^{v-1} P\left(l + m\frac{N}{v}, b\right) \text{ for } 0 \leq l \leq \frac{N}{v} - 1.$$

11. The method according to claim 9 wherein the step of averaging $P_s[l,b]$ sums among $$3\frac{N}{v}$$

values associated with three consecutive data bursts to generate an average summation $P_a[l,n]$ for $0 \leq n23\ 2$ is performed according to the relationship $$P_a[l, n] = \sum_{m=0}^{\lfloor \frac{b}{3} \rfloor} P_s[l, n + 3m] \text{ for } 0 \leq l \leq \frac{N}{v} - 1 \text{ and } n = \text{mod}(b, 3).$$

12. The method according to claim 9 wherein the step of averaging $P_s[l,b]$ sums among $$3\frac{N}{v}$$

values associated with three consecutive data bursts to generate an average summation $P_a[l,n]$ for $0 \leq n23\ 2$ is performed using a single pole filter according to the relationship $$P_a[l, n] \leftarrow (1 - \beta)P_a[l, n] + \beta P_s[l, b]$$

for $$0 \leq l \leq \frac{N}{v} - 1$$

and $n = \text{mod}(b,3)$, where $\beta$ is a programmable constant in the range $[0,1)$.

13. The method according to claim 9 wherein the step of estimating an integer frequency error offset corresponding to the maximum value for the summation $P_a[l,n]$, the corresponding index $l_{max}$, and the corresponding burst number $n_{max}$ is performed according to the relationship $$\Delta f_{int} = \text{round}\left(\frac{N}{2\pi L}\text{angle}(P_a[l_{max}, n_{max}])\right) - \frac{v}{L}l_{max},$$

where the angle( ) function returns a value in the range of $[0,2\pi)$ to represent the angle of its complex argument and the round( ) function returns an integer value in the range of $$\left[0, \frac{N}{L} - 1\right].$$

14. The method according to claim 9 wherein the complex conjugate multiply operation is performed according to the relationship $$\hat{p}[k, b] = e^{-j\frac{2\pi}{N}ks}Y[k,b]Y^*[k, b-1],$$

and further wherein $Y[k,b]$ is the frequency response of tone k in data burst b, N is the number of tones in a data burst, s is the slip value and $$\frac{2\pi}{N}k$$

is a sequence of known phase rotations.

15. The method according to claim 14 wherein the slip value s equals −1 when data burst b experiences a negative slip with respect to data burst b−1, and wherein the slip value s equals +1 when data burst b experiences a positive slip with respect to data burst b−1, and further wherein the slip value s equals 0 when data burst b experiences no slip with respect to data burst b−1.

16. The method according to claim 14 wherein the slip value s for data burst b, which can be written as s[b], is determined according to the relationship $$s[b] = \begin{cases} +1 & (MinIndex > DesiredIndex + SlipTotal[b-1]) \\ 0 & (MinIndex = DesiredIndex + SlipTotal[b-1]) \\ -1 & (MinIndex < DesiredIndex + SlipTotal[b-1]) \end{cases}$$

where $SlipTotal[b] = \sum_{k=0}^{SlipDelay-1} s[b-k],$ and wherein SlipDelay is a timing delay between the time when a timing adjustment is made to a data stream containing the data bursts and the time when a corresponding slip identification algorithm detects the adjustment, and further wherein Minindex is the index value of the minimum correlation value between two consecutive data bursts and DesiredIndex is the desired index for the minimum correlation value between the two consecutive data bursts.

17. An OFDM transceiver adapted to perform the steps of claim 1.

* * * * *